United States Patent
Sakamoto et al.

(10) Patent No.: US 6,732,593 B2
(45) Date of Patent: May 11, 2004

(54) ATTACHMENT STRUCTURE OF A LOAD SENSOR FOR A VEHICLE SEAT

(75) Inventors: Kazunori Sakamoto, Chiryu (JP); Morio Sakai, Toyota (JP); Tsutomu Takeuchi, Gamagori (JP); Yasunori Hasegawa, Kasugai (JP); Kentaro Morishita, Nagoya (JP); Osamu Fujimoto, Nisshin (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/242,455

(22) Filed: Sep. 13, 2002

(65) Prior Publication Data

US 2003/0066363 A1 Apr. 10, 2003

(30) Foreign Application Priority Data

Sep. 13, 2001 (JP) ........................................ 2001-278528

(51) Int. Cl.[7] .................................................. G01N 3/02
(52) U.S. Cl. ............................ 73/856; 73/862.47; 73/4; 177/144; 177/154
(58) Field of Search ................... 73/856, 862.4–862.14; 177/144, 154

(56) References Cited

U.S. PATENT DOCUMENTS

| 6,039,344 | A | | 3/2000 | Mehney et al. |
| 6,092,838 | A | * | 7/2000 | Walker ........................ 280/735 |
| 6,323,443 | B1 | * | 11/2001 | Aoki et al. ................... 177/144 |
| 6,561,300 | B1 | * | 5/2003 | Sakamoto et al. .......... 180/273 |

FOREIGN PATENT DOCUMENTS

| JP | 2001-12998 A | 1/2001 |
| JP | 2001-150997 A | 6/2001 |

* cited by examiner

Primary Examiner—Edward Lefkowitz
Assistant Examiner—Alandra Ellington
(74) Attorney, Agent, or Firm—Burns, Doane, Swecker & Mathis, L.L.P.

(57) ABSTRACT

An attachment structure installs a load sensor between a seating portion of a vehicle seat and a vehicle body through an attachment structure unit. The attachment structure unit includes a first attachment bracket for holding one end of the strain unit, and a second attachment bracket for holding the other end of the strain unit. At least a pair of attachment structure units are arranged at right and left portions of a front side, right and left portions of a back side, or right and left portions of the front and back sides of the seating portion relative to the vehicle seat and the first attachment brackets of the attachment structure units of the right and left are connected to each other through a connecting rod.

14 Claims, 7 Drawing Sheets

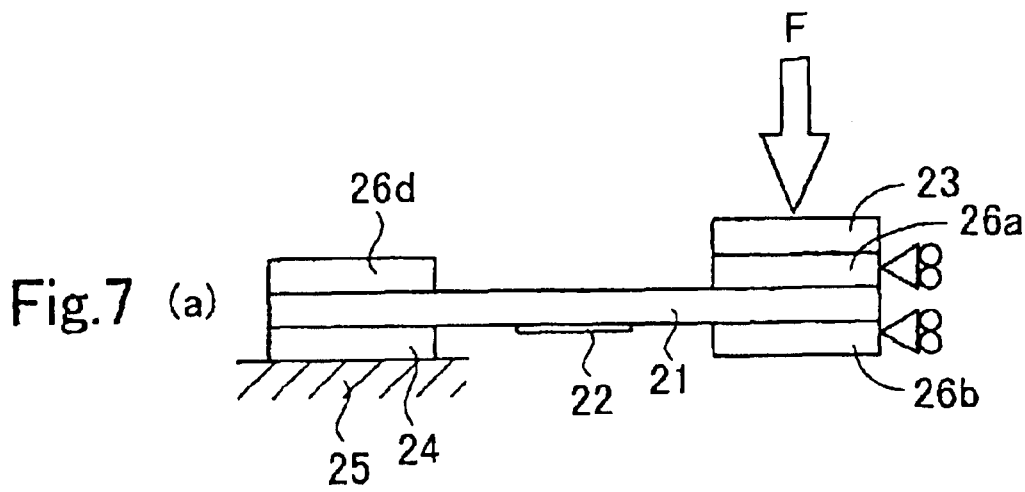
Fig.7 (a)
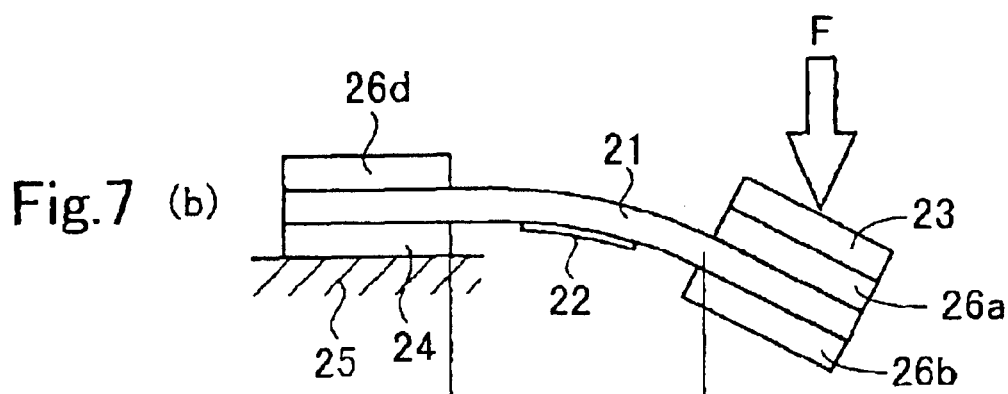
Fig.7 (b)
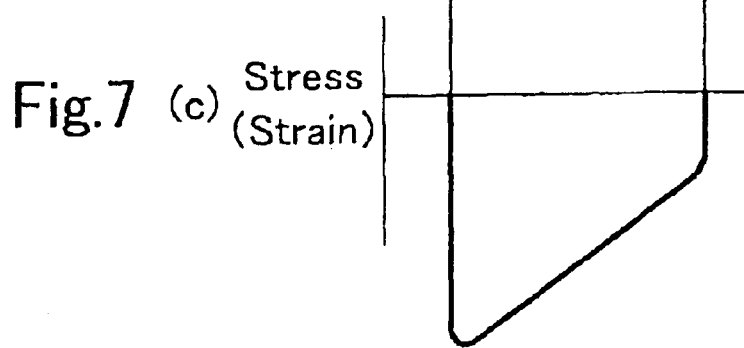
Fig.7 (c) Stress (Strain)

ATTACHMENT STRUCTURE OF A LOAD SENSOR FOR A VEHICLE SEAT

CROSS REFERENCE OF RELATED APPLICATION

This application is based on and claims priority under 35 U.S.C. §119 with respect to Japanese Application No. 2001-278528 filed on Sep. 13, 2001, the entire content of which is incorporated herein by reference.

FIELD OF THE INVENTION

This invention relates to an attachment structure of a load sensor for a vehicle seat More particularly, the present invention pertains to an attachment structure of a load sensor which detects a load on a seating portion of a seat when a passenger sits on the vehicle seat.

BACKGROUND OF THE INVENTION

In recent years, there is a tendency toward enforcing a safety of a passenger. In order to improve the safety of the passenger who sits on a seat, a restraint function of a seat belt and an operating function of an air bag in accordance with a weight of the passenger have been developed. When these devices are adopted, an accurate detection of a weight of the passenger is needed. As for one such means, a known device is disclosed in Japanese Patent Laid-Open Publication No. 2001-12998. The known device applies a means for attaching a weight sensor (ie., an attachment structure of a load sensor) to a seat mounted in a vehicle (ie., a vehicle seat).

Normally, as for a weight sensor to detect the weight of the passenger who sits on the seating portion of a seat cushion, a sensor with a strain gauge disposed in a plate-shaped strain unit is used for detecting a vertical strain of the strain unit. Therefore, in order to detect the weight of the passenger on the seat accurately, a precise input of the weight from the seating portion to a strain portion of the strain unit is needed. Thus, an attachment structure of a load sensor for the vehicle seat is particularly important.

However, in the known device, such importance of the attachment structure of a load sensor to a vehicle has not been recognized, and is designed merely not to exceed a height of the seating portion in a normal sitting condition when the weight sensor is attached.

SUMMARY OF THE INVENTION

Accordingly, an object of this invention is to provide an attachment structure of a load sensor for a vehicle seat which can precisely detect the weight of the passenger on a seat.

According to the first aspect of the invention, the attachment structure installs a load sensor between a seating portion of a vehicle seat and a vehicle body through an attachment structure unit. The load sensor has a plate-shaped strain unit and a strain gauge for detecting a vertical strain of the strain unit. The attachment structure unit is comprised of a first attachment bracket for holding one end of the strain unit, and a second attachment bracket for holding the other end of the strain unit. At least a pair of attachment structure units are arranged at right and left portions of a front side, right and left portions of a back side, or right and left portions of the front and back sides of the vehicle seat relative to the seating portion, and the first attachment bracket are arranged at both the right and left portions of the front side, the back side, or the front and the back sides of the vehicle seat and connected to each other through a connecting rod.

According to the second aspect of the invention, the attachment structure installs the load sensor between a seating portion of a vehicle seat and a vehicle body through an attachment structure unit. The load sensor has a plate-shaped strain unit and a strain gauge for detecting a vertical strain of the strain unit. The attachment structure unit is comprised of a first attachment bracket for holding one end of the strain unit, and a second attachment bracket for holding the other end of the strain unit. At least a pair of attachment structure units are arranged at right and left portions of a front side, right and left portions of a back side, or right and left portions of the front and back sides of the vehicle seat relative to the seating portion, and the second attachment bracket are arranged at both the right and left portions of the front side, the back side, or the front and the back sides of the vehicle seat and each pair of the second bracket and connected to each other through a connecting rod.

According to the third aspect of the invention, while a pair of the first attachment brackets are arranged at right and left portions of a front side, a back side, or the front and the back sides of the vehicle seat relative to the seating portion and connected to each other by the connecting rod, the second attachment brackets are arranged at right and left portions of a front side, a back side, or the front and the back sides of the vehicle seat and connected to each other through another connecting rod.

In the attachment structure of the load sensor of the present invention, the attachment structures are arranged at the right and left portions of the front and back of of the vehicle seat relative to the seating portion, and connected to each other through the connecting rod. Therefore, attachment errors relative to each load sensor on the right and left and an unnecessary stress affecting the load sensor caused by the pitch discrepancy between the rails can be prevented. Moreover, an unnecessary stress caused by the distortion and deflection of the seat cushion when the passenger sits on the seat cushion can be prevented as well.

BRIEF DESCRIPTION OF THE INVENTION

The foregoing and additional features and characteristics of the present invention will become more apparent from the following detained description considered with reference to the accompanying drawing figures in which like reference numerals designate like elements:

FIG. 7 is a pattern diagram to be compared with FIG. 6; and

DETAILED DESCRIPTION OF THE INVENTION

Figure 1:
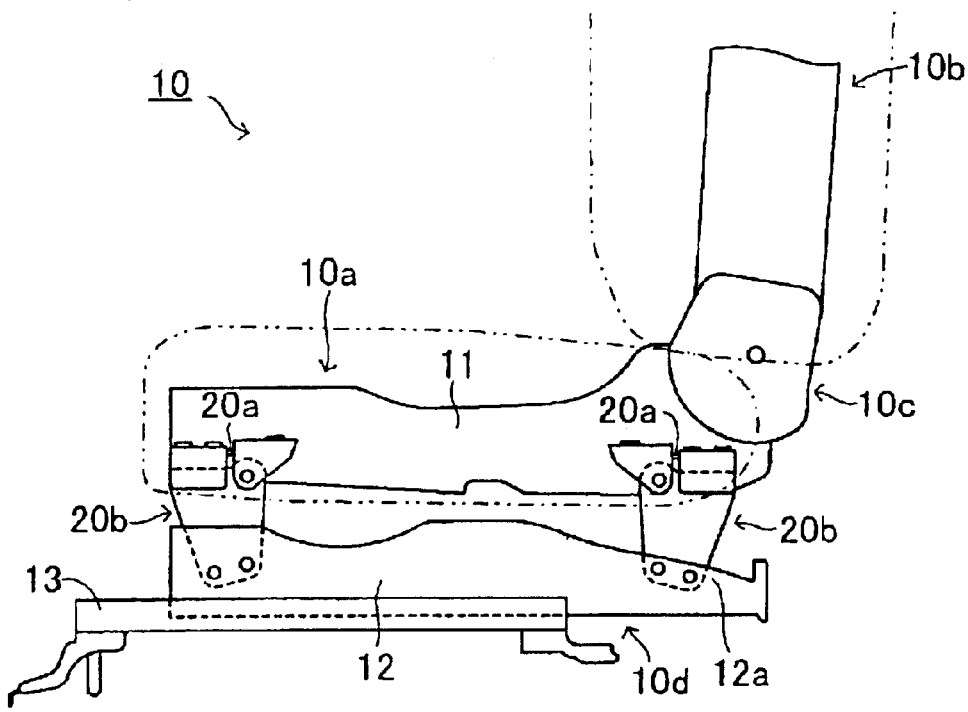
FIG. 1 is a schematic side view of a seat for a vehicle with a load sensor according to an embodiment of the invention.

An embodiment of this invention will be explained with reference to the attached drawings. FIG. 1 shows a vehicle seat with a load sensor by applying an attachment structure according to one example of this invention. The vehicle seat 10 is comprised of a seat cushion 10a, a seat back 10b, a reclining mechanism 10c, a slide mechanism 10d, and an attachment structure unit 20b with a load sensor 20a installed between the seat cushion 10a, and the slide mechanism 10d.

In the vehicle seat 10, a lower end of the seat back 10b is installed in a rear end of the seat cushion 10a through the reclining mechanism 10c. The seat back 10b is held in a standing position by a function of the seat reclining mechanism 10c, and a reclining position of the seat back 10b in a longitudinal direction relative to the seat cushion 10a can be adjusted by operating the reclining mechanism 10c.

In the vehicle seat 10, a seat body is disposed on a floor of a vehicle body through the slide mechanism 10d having an upper rail 12 and a lower rail 13. A cushion frame 11 of the seat cushion 10a forming the vehicle seat 10 is supported through each of the attachment structures 20b applied to install four load sensors 20a in the upper rail 12 forming the slide mechanism 10d. The seat body is fixed to a required position by a function of the slide mechanism 10d, and by operating the slide mechanism 10d, a longitudinal position of the seat body relative to the vehicle seat 10 can be adjusted.

In the vehicle seat 10, the seat cushion 10a corresponds to a seating portion of a seat of the present invention, and the slide mechanism 10d corresponds to a vehicle body of the present invention. Four load sensors 20a are arranged between the cushion frame 11 of the seat cushion 10 and the upper rail 12 of the slide mechanism 10d. More specifically, two of the load sensors 20a are arranged at right and left portions of a front side relative to the seat cushion 10a, and the other two are arranged at right and left portions of a back side of the vehicle seat 10 relative to the seat cushion 10a.

In the vehicle seat 10 shown in FIG. 1, structures of both attachment structure units 20b mounted with load sensors 20a respectively are identical except that the load sensors 20a of the front and back of the vehicle seat 10 relative to the seating portion are placed in reverse in a longitudinal direction relative to the vehicle seat 10. Therefore, with respect to a description of the attachment structure of the load sensor 20a, the attachment structure of the load sensor 20a located in back and left sides of the seat cushion 10a relative to the vehicle seat 10 and its attachment structure unit 20b will be described in detail. On the other hand, the load sensors 20a arranged at the other parts of the vehicle seat 10 and their attachment structure units 20b will be described only when necessary.

Figure 3:
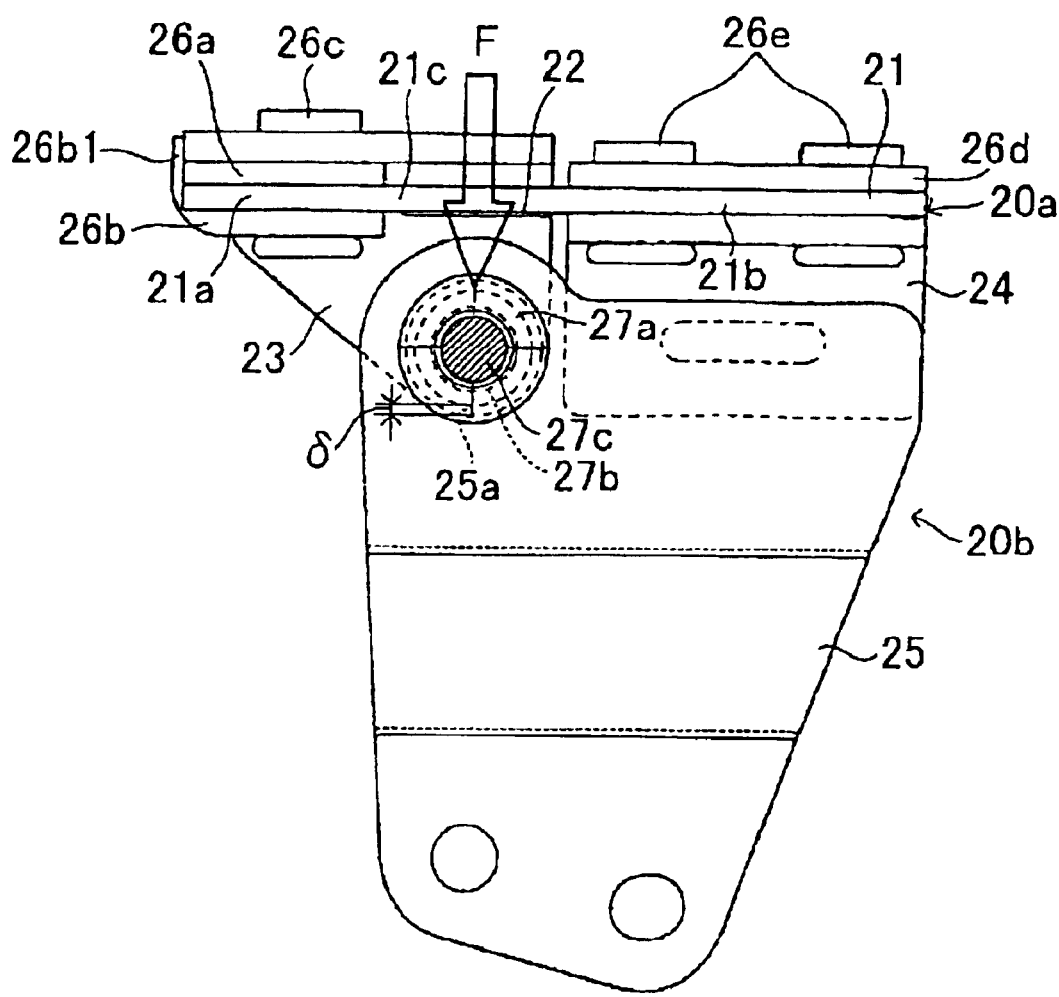
FIG. 3 is an enlarged view of the attachment structure shown in FIG. 1.
Figure 4:
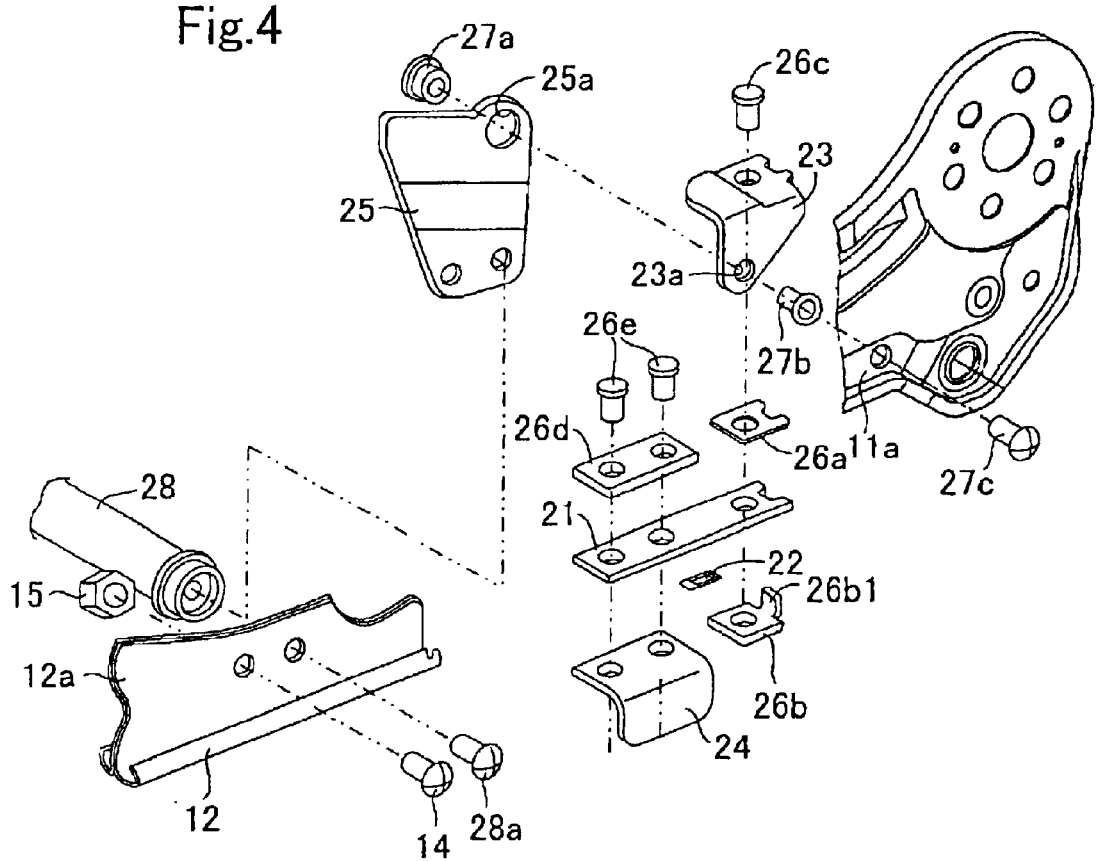
FIG. 4 is an exploded perspective view of the attachment structure shown in FIG. 1.

As shown in FIG. 3 and FIG. 4, the load sensor 20a includes a strain plate 21 which is a strain unit and a strain gauge 22. The strain gauge 22 is adhered to a middle portion of a lower surface of the strain plate 21 in the longitudinal direction relative to the strain plate 21, and the load sensor 20a is assembled within the attachment structure unit 20b.

As shown in FIG. 3 and FIG. 4, the attachment structure unit 20b includes an upper bracket 23, a lower bracket 24, and a base bracket 25 as primary components, and cross sectional surfaces of the upper bracket 23 and the lower bracket 24 are close to "L" shape. A shape of the base bracket 25 is a slightly bent flat plate. The lower bracket 24 is fixed on an upper end of the base bracket 25 by welding.

The base bracket 25 functions to fix the lower bracket 24 in an arm 12a (ie., a longitudinal wall relative to the vehicle seat 10) of the upper rail 12 located in the slide mechanism 10d.

Figure 5:
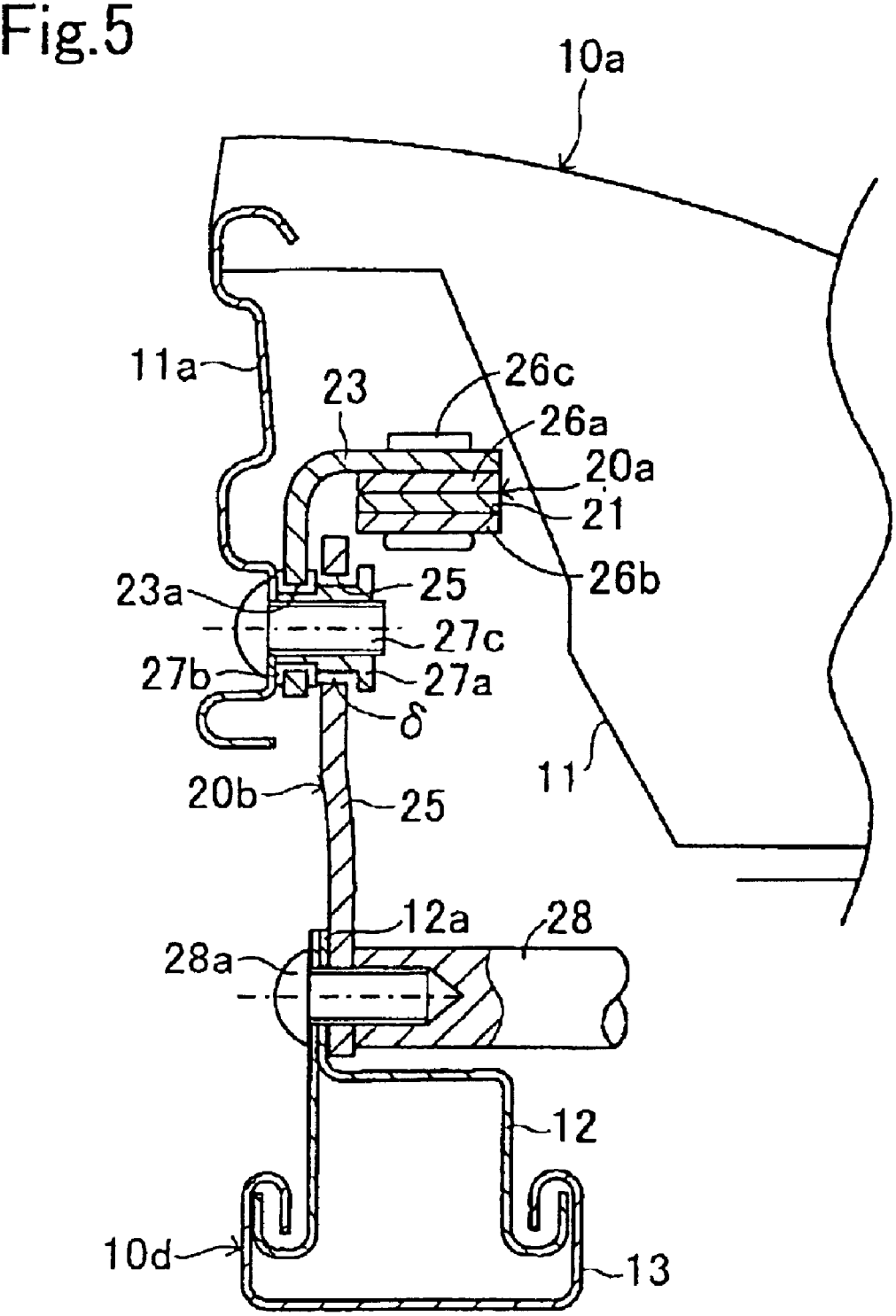
FIG. 5 is a longitudinal sectional view of the attachment structure shown in FIG. 1.

In the attachment structure unit 20b, the upper bracket 23 correspond to a first attachment bracket of the present invention, and one end of the strain plate 21 forming the load sensor, 20a is fixed by being retained between an upper spacer 26a and a lower spacer 26b through a rivet 26c. Furthermore, as shown in FIG. 5, the upper bracket 23 is installed in a side panel 11a of the cushion frame 11, and the upper bracket 23 is connected to the base 25 through the load sensor 20a. In addition, a positioning portion 26b1 is formed in a lower spacer 26b to engage each notch disposed in the strain plate 21, the upper bracket 23, and the upper spacer 26a to fix them together by detent. By this structure, a position of a strain portion 21c is determined accurately (ie., a determination of the value of the strain portion).

Also, in the attachment structure unit 20b, the lower bracket 24 is integral with the base bracket 25, forming a second attachment bracket of the present invention. On an upper surface of an upper wall of the lower bracket 24, the other end of the strain plate 21 forming the load sensor 20a is fixed through a pair of rivets 26e, being retained between the lower bracket 24 and a spacer 26d. As shown in FIG. 5, the base bracket 25 is fixed by securing its lower side surface in the arm 12a of the upper rail 12 through a bolt 28a, a connecting rod 28, a bolt, and a nut (not shown). Furthermore, the base bracket 25 is connected to the upper bracket 23 through the lower bracket 24 and the load sensor 20a.

A pierce nut 27a, a bush 27b, and a bolt 27c are used for connecting the side panel 11a of the cushion frame 11 to the upper bracket 23, and as shown in FIG. 5, the bush 27b is fitted in an installation hole 23a of the upper bracket 23 by staking. A bearing metal with low frictional resistance is used for the bush 27b. The pierce nut 27a is inserted into a stopper hole 25a of the base bracket 25 with a predetermined clearance 6 in the vertical direction relative to the vehicle seat 10. Under this condition, an end portion of the pierce nut 27a is fitted within an inner hole of the bush 27b so that the pierce nut 27a can be rotated relatively with the bush 27b.

The bolt 27c is screwed into the pierce nut 27a which is fitted as shown in FIG. 5 by being inserted from outside the side panel 11a of the cushion frame 11. The pierce nut 27a and the bolt 27b are integral with one another, forming a connecting pin. Also, the pierce nut 27a and the stopper hole 25a of the base bracket 25 form a strain restriction means which restricts a strain (ie., an elastic deformation) of the strain plate 21 in the vertical direction relative to the vehicle seat 10 to a predetermined value, functioning as a limiter (ie., protecting the sensor from a breakdown by not reaching a bottom when an excessive load is put on the sensor) against a great load (ie., 1000–1500N) from the seat cushion 10a.

In the attachment structure in which the load sensor 20a is attached, as shown in FIG. 3, the strain portion 21c which is deformable in the vertical direction relative to the vehicle seat 10 is located between retained portions 21a and 21b, and the strain gauge 22 is located in a center of a lower side of the strain portion 21c. Furthermore, a connecting portion of the side panel 11a of the cushion frame 11 and the upper bracket 23 (ie., the pierce nut 27a and the bolt 27b) is located in a lower surface of a central portion of the strain portion 21c.

Figure 2:
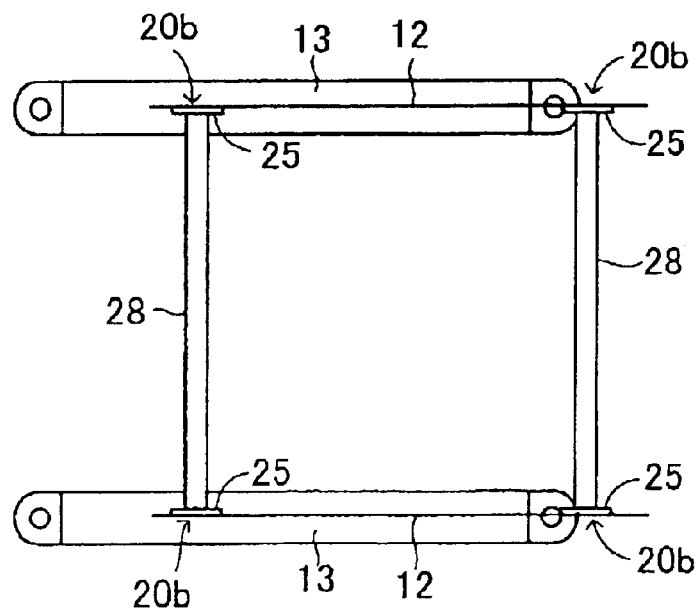
FIG. 2 is a pattern diagram of the attachment structures for installing the load sensors shown in FIG. 1 located right and left under the condition in which they are connected each other.

In both attachment structure units 20b arranged at right and left sides of the seat cushion 10a relative to the vehicle seat 10, both base brackets 25 which form the attachment structure units 20b are connected to each other through the connecting rod 28 shown in FIG. 2 and FIG. 4. The connecting rod 28 is installed by fitting its both ends in the base bracket 25 and the upper rail 12 respectively through the bolt 28a.

By the above structure, the connecting rod 28 maintains predetermined width between the base brackets 25 of right and left of the vehicle seat cushion 10a relative to the seating portion by connecting the base brackets 25 of the right and left of the seat cushion 10a relative to the seating portion, as shown schematically in FIG. 2. In other words, the connecting rod 28 maintains the predetermined width of the attachment structure units 20b which are integral with the base brackets 25. Moreover, with respect to a connection of the attachment structure units 20b of the right and left of the vehicle seat cushion 10a relative to the seating portion, the upper brackets 23 disposed in the attachment structure units 20b of the right and left of the vehicle seat 10 relative to the seating portion can be connected each other through the connecting rod 28. By this structure, the width between the attachment structures 20b of the right and left of the seating portion relative to the vehicle seat 10 can also be maintained consistently.

In the attachment structure (ie., the attachment structure unit 20b) described above, one end of the strain plate 21 forming the load sensor 20a is fixed to the cushion frame 11 of the seat cushion 10a located in the seating portion. At the same time, the other end of the strain plate 21 is fixed in the upper rail 12 of the slide mechanism 10d located in the vehicle body. A strain portion 21c is defined between the fixed ends of the strain plate 21, and a load input point from the seat cushion 10a (ie., a load F shown with the arrow in FIG. 3) is defined at an approximately center of the strain portion 21c of the strain plate 21.

Figure 6:
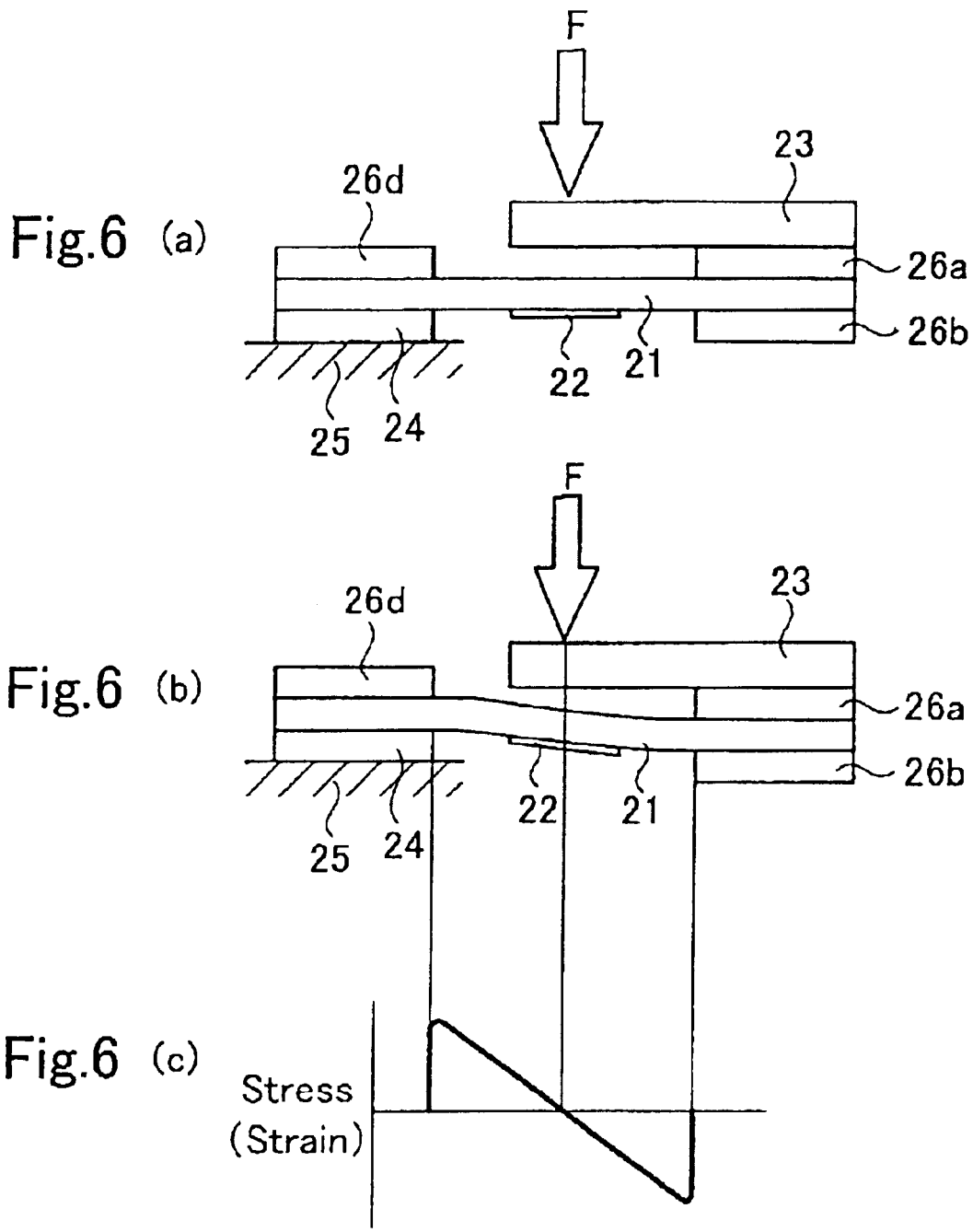
FIG. 6 is a pattern diagram of the attachment structure shown in FIG. 1 when a load is given.

Therefore, when the load F is inputted into the attachment structure unit 20b as shown in FIG. 6(a), the strain portion 21c of the strain plate 21 is deformed in the vertical direction relative to the vehicle seat 10 as shown in FIG. 6(b), and a stress (ie., a strain) is distributed the both ends of the strain plate 21 receive the maximum positive and negative stresses respectively, and the central portion of the strain plate 21 receives the minimum stress as shown in FIG. 6(c). However, if the load input position from the seat cushion 10a is defined in one side of the strain portion 21c, when the load is inputted into the attachment structure unit 20b, the stress (ie., the strain) is distributed that, as shown in FIG. 7(c), the other end of the strain plate 21 receives the maximum stress (ie., a greater value than the maximum value shown in FIG. 6), and the one end of the strain plate 21 receives the minimum stress. Therefore, the stress distribution of a structure shown in FIG. 7 not only causes an uneven stress distribution, it also increases the maximum stress. If an excessive stress is put on the strain plate 21, a residual strain in the strain portion 21 can be occurred. Consequently, the stress distribution shown in FIG. 7 can damage the strain plate 21, and an accurate detection of the load from the seating portion becomes impossible.

Therefore, according to the attachment structure unit 20b, by minimizing the maximum stress and improving the balance of the stress generated by the load input toward the strain portion 21c of the strain plate 21, (ie., FIG. 6(c) compared with FIG. 7(c)), the structure in which the stress is inputted into the attachment structure 20b prevents the strain plate 21 from damages caused by the excessive stress and uneven stress distribution. Also, by the above structure, downsizing and weight reduction of the strain plate 21 can be achieved. At the same time, by designing the strain plate 21 within the value of predetermined stress (or strain), an extraction of a strain signal from the strain gauge 22 on a large scale becomes possible. Thus, from a viewpoint of levels of the signals (S/N ratio) toward noise, the attachment structure unit 20b is improved, maintaining a high accuracy of the detection. Furthermore, because the maximum stress is reduced and the stress balance is improved, a secular change is also reduced Thus, the load sensor 20a can maintain a precise detection of the load from the seating portion, in other words, a weight of a passenger.

Moreover, according to the attachment structure, the attachment structure unit 20b has the upper bracket 23 installing one end of the strain plate 21 to the seat cushion 10a of the vehicle seat 10 by retaining one end of the strain plate 21. The attachment structure unit 20b also has the lower bracket 24 integral with the base bracket 25 which is installed in the upper rail 12 located in the vehicle body by retaining the other end of the strain plate 21.

In addition, in the attachment structure unit 20b, the bolt 27c of the upper bracket 23 is screwed and connected to the pierce nut 27a which is inserted into the stopper hole 25a of the base bracket 25 in the portion downward of the central portion of the strain portion 21c. By this structure, the strain restriction means is formed by forming the circularly-ringed clearance δ (a clearance δ in the vertical direction relative to the vehicle seat 10) between a circular outer periphery of the pierce nut 27a and a circular inner periphery of the stopper hole 25a of the base bracket 25. The strain restriction means restricts the strain of the strain plate 21 in the vertical direction relative to the vehicle seat 10 to the predetermined value. Also, the pierce nut 27a is installed by being screwed into a connecting hole 23a through the bush 27b with low frictional resistance (ie., a low coefficient of friction).

According to the attachment structure unit 20b, the strain restriction means can be achieved without increasing the number of parts within the attachment structure unit 20b. Furthermore, upon an assembly process of the attachment structure unit 20b, the upper bracket 23 and the lower bracket 24 are assembled in both ends of the strain plate 21 at first. Under this condition, the installation hole 23 is aligned coaxially with the stopper hole 25a of the base bracket 25 as the lower bracket 24 and the base bracket 25 are welded. By this assembly process, an accuracy of the positions of each component member comprising the attachment structure unit 20b is assured. Consequently, a manufacturing accuracy can be heightened. Also, as shown in FIG. 3, the pierce nut 27a and the stopper hole 25a, in other words, the strain restriction means, are arranged on the input line of the load F. Therefore, the strain of the strain plate 21 in the vertical direction relative to the vehicle seat 10 can be restricted precisely to the predetermined value. Moreover, by the above structure, the stress generated by the friction in the installation hole 23a of the upper bracket 23 of the pierce nut 27a forming the engaging pin is prevented. As a result, effects related to the stress on the strain portion 21c of the strain plate 21 are prevented. Therefore, a stabilization of a performance of the load sensor 20a can be achieved.

On the other hand, in the vehicle seat 10, the four load sensors 20a are placed in the side portions of the front and back of the seat cushion 10a relative to the vehicle seat 10 respectively, and the base brackets 25 of the right and left attachment structures 20b on the right and left of the seat cushion 10a relative to the vehicle seat 10 are connected to each other by the connecting rod 28. By this structure, attachment errors relative to each load sensor 20a on the right and left and an unnecessary stress affecting the load sensor 20a caused by the pitch discrepancy between the rails can be prevented. Moreover, an unnecessary stress caused by the distortion and deflection of the seat cushion 10a when the passenger sits on the seat cushion 10a can be prevented as well (In order to acquire this function effectively, it is desirable to apply the structure that the upper brackets 23 of the attachment structure units 20b of the right and left are connected each other by the connecting rod 28).

In the embodiment of this invention, the strain restriction means for restricting the strain of the strain plate 21 in the vertical direction relative to the vehicle seat 10 in the predetermined value is installed in the portion located downward relative to and opposed to the central portion of the strain portion 21c of the strain plate 21. However, it is possible to install the strain restriction means in the portion located upward relative to and opposed to the central portion of the strain portion 21c of the strain plate 21. Furthermore, although the strain plate 21 and the spacers 26a, 26b, and 26d are formed separately, it is possible to integrate them together (manufacturing by forging or cutting) to stabilize the performance and reduce the number of parts.

Figure 8:
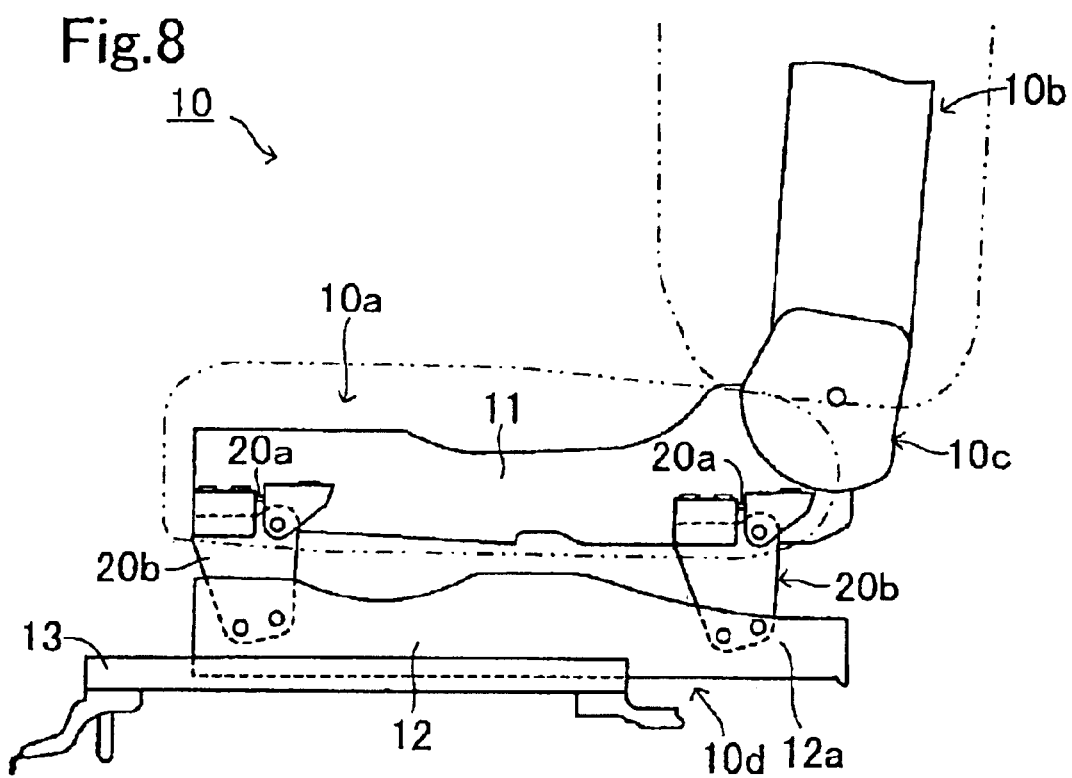
FIG. 8 is a schematic side view showing a vehicle seat in which a layout of the load sensor is changed.

Also, in the embodiment of this invention, as shown in FIG. 1, the load sensor 20a of the front and back relative to the seat cushion are placed opposing each other. However, as shown in FIG. 8, it is possible to place them in the same direction. Moreover, it is possible to place the load sensors 20a shown in FIG. 1 in back to front, or place the load sensors 20a shown in FIG. 8 in back to front.

What is claimed is:

1. An attachment structure for installing a load sensor between a seating portion of a vehicle seat and a vehicle body through the attachment structure, the load sensor having a plate-shaped strain unit and a strain gauge for detecting a vertical strain of the plate-shaped strain unit, the attachment structure comprising;

an attachment structure unit having a first attachment bracket for holding one end of the plate-shaped strain unit forming the load sensor and attached to the seating portion of the vehicle seat and a second attachment bracket for holding the other end of the plate-shaped strain unit and attached to the vehicle body;

a strain portion defined between each fixed end of the plate-shaped strain unit;

the second attachment bracket being provided with a stopper hole; and a bolt passing through the stopper hole in the second attachment bracket and through the first attachment bracket, the stopper hole in the second attachment bracket permitting relative vertical movement between the first and second attachment brackets to restrict movement of the plate-shaped strain unit in a vertical direction relative to the vehicle seat upon application of a load to the attachment structure, wherein at least a pair of attachment structure units is arranged at right and left portions of the front side, right and left portions of a back side, or right and left portions of the front and back sides of the vehicle seat relative to the seating portion, and at least a pair of the second attachment brackets is connected to each other through a connecting rod.

2. An attachment structure of a load sensor for a vehicle seat according to claim 1, comprising an additional bracket connected to the second attachment bracket, the second attachment bracket holding the other end of the plate-shaped strain unit by way of the additional bracket.

3. An attachment structure of a load sensor for a vehicle seat according to claim 1, comprising an upper spacer and a lower spacer positioned on opposite sides of the plate-shaped strain unit, and a connecting device connecting the upper spacer, the lower spacer, the plate-shaped strain unit and the first attachment bracket.

4. An attachment structure for installing a load sensor between a seating portion of a vehicle seat and a vehicle body through the attachment structure, the load sensor having a plate-shaped strain unit and a strain gauge for detecting a vertical strain of the plate-shaped strain unit, comprising;

an attachment structure unit having a first attachment bracket for holding one end of the plate-shaped strain unit forming the load sensor and attached to the seating portion of the vehicle seat and a second attachment bracket for holding the other end of the plate-shaped strain unit and attached to the vehicle body;

a strain portion defined between each fixed end of the plate-shaped strain unit;

the second attachment bracket being provided with a stopper hole; and a bolt passing through the stopper hole in the second attachment bracket and through the first attachment bracket, the stopper hole in the second attachment bracket permitting relative vertical movement between the first and second attachment brackets to restrict movement of the plate-shaped strain unit in a vertical direction relative to the vehicle seat upon application of a load to the attachment structure, wherein at least a pair of attachment structure units is arranged at right and left portions of a front side, right and left portions of a back side, or right and left portions of the front and back sides of the vehicle seat relative to the seating portion and at least a pair of the first attachment brackets is connected to each other through a connecting rod.

5. An attachment structure of a load sensor for a vehicle seat according to claim 4, wherein at least a pair of the second attachment brackets are arranged at both right and left portions of a front side, a back side, or the front and the back sides of the seating portion and connected to each other through another connecting rod.

6. An attachment structure of a load sensor for a vehicle seat according to claim 4, comprising an additional bracket connected to the second attachment bracket, the second attachment bracket holding the other end of the plate-shaped strain unit by way of the additional bracket.

7. An attachment structure of a load sensor for a vehicle seat according to claim 4, comprising an upper spacer and a lower spacer positioned on opposite sides of the plate-shaped strain unit, and a connecting device connecting the upper spacer, the lower spacer, the plate-shaped strain unit and the first attachment bracket.

8. A load sensor attachment structure in a vehicle seat which is mounted on a vehicle body comprising:

a pair of load sensors each comprised of a plate-shaped strain unit and a strain gauge located between opposite ends of the plate-shaped strain unit for detecting a vertical strain of the plate-shaped strain unit;

a pair of first attachment brackets each holding one end of one of the plate-shaped strain units and attached to a seating portion of the vehicle seat;

a pair of second attachment brackets each holding an opposite end of one of the plate-shaped strain units and attached to the vehicle body, the pair of second attachment brackets being positioned on right and left sides of the vehicle seat;

a connecting rod extending between the pair of second attachment brackets and connected by a fastener to each of the second attachment brackets.

9. A load sensor attachment structure in a vehicle seat according to claim 8, wherein each of the second attachment brackets holds the opposite end of one of the plate-shaped strain units by way of an additional bracket.

10. A load sensor attachment structure in a vehicle seat according to claim 8, comprising an upper spacer and a lower spacer connected on opposite sides of each of the plate-shaped strain units by way of a rivet that also passes through the first attachment bracket holding the one end of the respective plate-shaped strain unit.

11. A load sensor attachment structure in a vehicle seat according to claim 8, wherein the fastener connecting the connecting rod to each of the second attachment brackets is a bolt passing through a hole in the second attachment bracket.

12. A load sensor attachment structure in a vehicle seat according to claim 8, wherein the connecting rod is also connected to an upper rail of a seat slide mechanism.

13. A load sensor attachment structure in a vehicle seat according to claim 8, comprising a stopper hole provided in each second attachment bracket, and a pair of connecting devices each passing through the stopper hole in one of the second attachment brackets and through a hole in one of the first attachment brackets, the stopper hole in each second attachment bracket being sized to provide a clearance between the stopper hole and the connecting device to permit relative vertical movement between the first and second attachment brackets and restrict movement of the plate-shaped strain unit in a vertical direction relative to the vehicle seat upon application of a load to the attachment structure.

14. A load sensor attachment structure in a vehicle seat according to claim 13, wherein each connecting device comprises a pierce nut fitted into the stopper hole and a bolt screwed into the pierce nut.

\* \* \* \* \*